(12) United States Patent
Mackin et al.

(10) Patent No.: US 8,150,584 B2
(45) Date of Patent: Apr. 3, 2012

(54) GENERATION AND STARTING SYSTEM

(75) Inventors: Ryan Patrick Mackin, Milan, IL (US);
Daniel James Burke, Cordova, IL (US);
Glenn E. Pope, Viola, IL (US); Alan David Sheidler, Moline, IL (US); Jim Milton Shoemaker, Bettendorf, IA (US); Ronnie Dean Stahlhut, Bettendorf, IA (US)

(73) Assignee: Deere & Company, Moline, IL (US)

( * ) Notice: Subject to any disclaimer, the term of this patent is extended or adjusted under 35 U.S.C. 154(b) by 414 days.

(21) Appl. No.: 12/464,158

(22) Filed: May 12, 2009

(65) Prior Publication Data
US 2010/0289327 A1 Nov. 18, 2010

(51) Int. Cl.
*A01D 41/12* (2006.01)

(52) U.S. Cl. .......... 701/50; 701/51; 701/52; 701/54; 701/55

(58) Field of Classification Search .......... 701/50–55
See application file for complete search history.

(56) References Cited

U.S. PATENT DOCUMENTS

| | | | |
|---|---|---|---|
| 3,690,395 A * | 9/1972 | Spiller et al. | 180/6.48 |
| 4,392,393 A | 7/1983 | Montgomery | |
| 5,995,895 A * | 11/1999 | Watt et al. | 701/50 |
| 6,306,056 B1 | 10/2001 | Moore | |
| 7,013,646 B1 * | 3/2006 | Serkh et al. | 60/698 |
| 7,431,113 B2 * | 10/2008 | Deppe | 180/65.31 |
| 7,788,889 B2 * | 9/2010 | Sheidler | 56/10.7 |
| 7,974,757 B2 * | 7/2011 | Mackin et al. | 701/50 |
| 2005/0178100 A1 * | 8/2005 | Deppe | 56/11.9 |
| 2007/0130950 A1 * | 6/2007 | Serkh et al. | 60/698 |
| 2009/0308036 A1 * | 12/2009 | Sheidler | 56/10.7 |

FOREIGN PATENT DOCUMENTS

| | | |
|---|---|---|
| DE | 1780052 A1 | 1/1972 |
| EP | 1563724 A1 | 8/2005 |
| EP | 2135501 A1 | 12/2009 |

OTHER PUBLICATIONS

European Search Report dated Aug. 24, 2010, (7 pages).

* cited by examiner

*Primary Examiner* — Joanne Silbermann
*Assistant Examiner* — Michael Stabley

(57) ABSTRACT

An agricultural vehicle including plurality of engines, a plurality of mechanical loads, a plurality of electrical generators, a plurality of electrical loads, at least one load sensor, and a controller. The plurality of engines includes a first engine and a second engine. The plurality of mechanical loads includes a first mechanical load and a second mechanical load. The first mechanical load is coupled to the first engine and a second mechanical load is coupled to the second engine. The plurality of electrical generators includes a first generator and a second generator. The first generator is coupled to the first engine and the second generator is coupled to the second engine. The plurality of electrical loads can be separately coupled to the first generator or the second generator. The at least one load sensor is configured to produce a signal representative of the first mechanical load on the first engine, the second mechanical load on the second engine, a sum of electrical loads on the first generator, and/or a sum of electrical loads on the second generator. The controller is configured to shift at least one of the plurality of electrical loads between the first generator and the second generator dependent upon the signal.

8 Claims, 2 Drawing Sheets

GENERATION AND STARTING SYSTEM

BACKGROUND OF THE INVENTION

1. Field of the Invention

The present invention relates to agricultural machinery having multiple engines, and, more particularly, to an agricultural harvester with dual engines.

2. Description of the Related Art

Internal combustion engines utilize in combination with electric generators and motors are well known. Internal combustion engines and electric motors are used to drive hybrid vehicles and it is known to use regeneration techniques so that the electric motor generates electrical power when the vehicle is executing a braking maneuver. Dual engines or even an engine having a dual crank shaft system is used to power vehicles and a transmission is coupled thereto for transferring the driving torque of the engine to the motor/generator of the vehicle. The dual engine system is engaged when additional load levels are required, such as, during acceleration, climbing a hill, or pulling a heavy load. It is also known to utilize an electric motor to assist in providing the torque when additional increased loads are applied to the engine.

What is needed in the art is a system for the generation of electrical power and for the starting of a dual engine system in an agricultural vehicle.

SUMMARY OF THE INVENTION

The present invention provides an agricultural vehicle including plurality of engines, a plurality of mechanical loads, a plurality of electrical generators, a plurality of electrical loads, at least one load sensor, and a controller. The plurality of engines includes a first engine and a second engine. The plurality of mechanical loads includes a first mechanical load and a second mechanical load. The first mechanical load is coupled to the first engine and a second mechanical load is coupled to the second engine. The plurality of electrical generators includes a first generator and a second generator. The first generator is coupled to the first engine and the second generator is coupled to the second engine. The plurality of electrical loads can be separately coupled to the first generator or the second generator. The at least one load sensor is configured to produce a signal representative of the first mechanical load on the first engine, the second mechanical load on the second engine, a sum of electrical loads on the first generator, and/or a sum of electrical loads on the second generator. The controller is configured to shift at least one of the plurality of electrical loads between the first generator and the second generator dependent upon the signal.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention, and such exemplifications are not to be construed as limiting the scope of the invention in any manner.

DETAILED DESCRIPTION OF THE INVENTION

Figure 1:
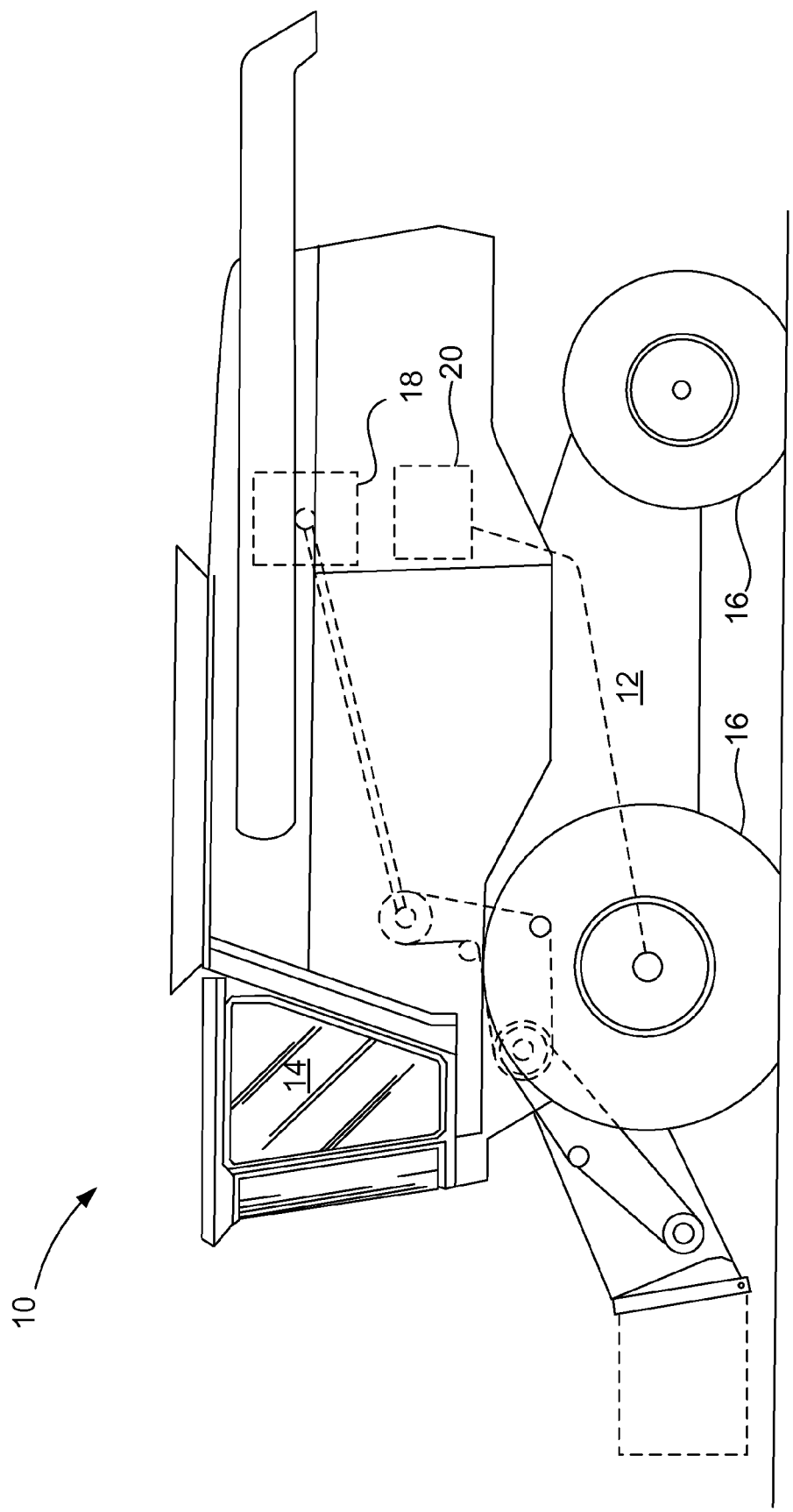
FIG. 1 is a side view of a harvester utilizing an embodiment of the generation and starting system of the present invention.

Referring now to the drawings, and more particularly to FIG. 1, there is shown an agricultural vehicle 10 also more particularly illustrated as a harvester 10, which includes a chassis 12, cabin/controls 14, wheels 16, power system 18 and power system 20. Harvester 10 has a variety of mechanical and electrical systems thereon including a crop-gathering header that directs crop material to a threshing section. The threshing section separates the grain from other crop material and directs the grain to a sieve area for further separation of the grain from the lightweight crop material. The grain is then conveyed to a storage area for later conveyance to a grain transport vehicle. Chassis 12 provides structural integrity for harvester 10 and is used to support the mechanical and electrical systems therein. Controls in cabin 14 provide an operator with the ability to direct the functions of harvester 10. Wheels 16 support chassis 12 and allow a propulsion system to move harvester 10 as directed by the operator utilizing controls 14. Power systems 18 and 20 are configured to have separate loads, for example, one of the power systems may provide power for the propulsion system and another provide power to the threshing section of harvester 10.

Figure 2:
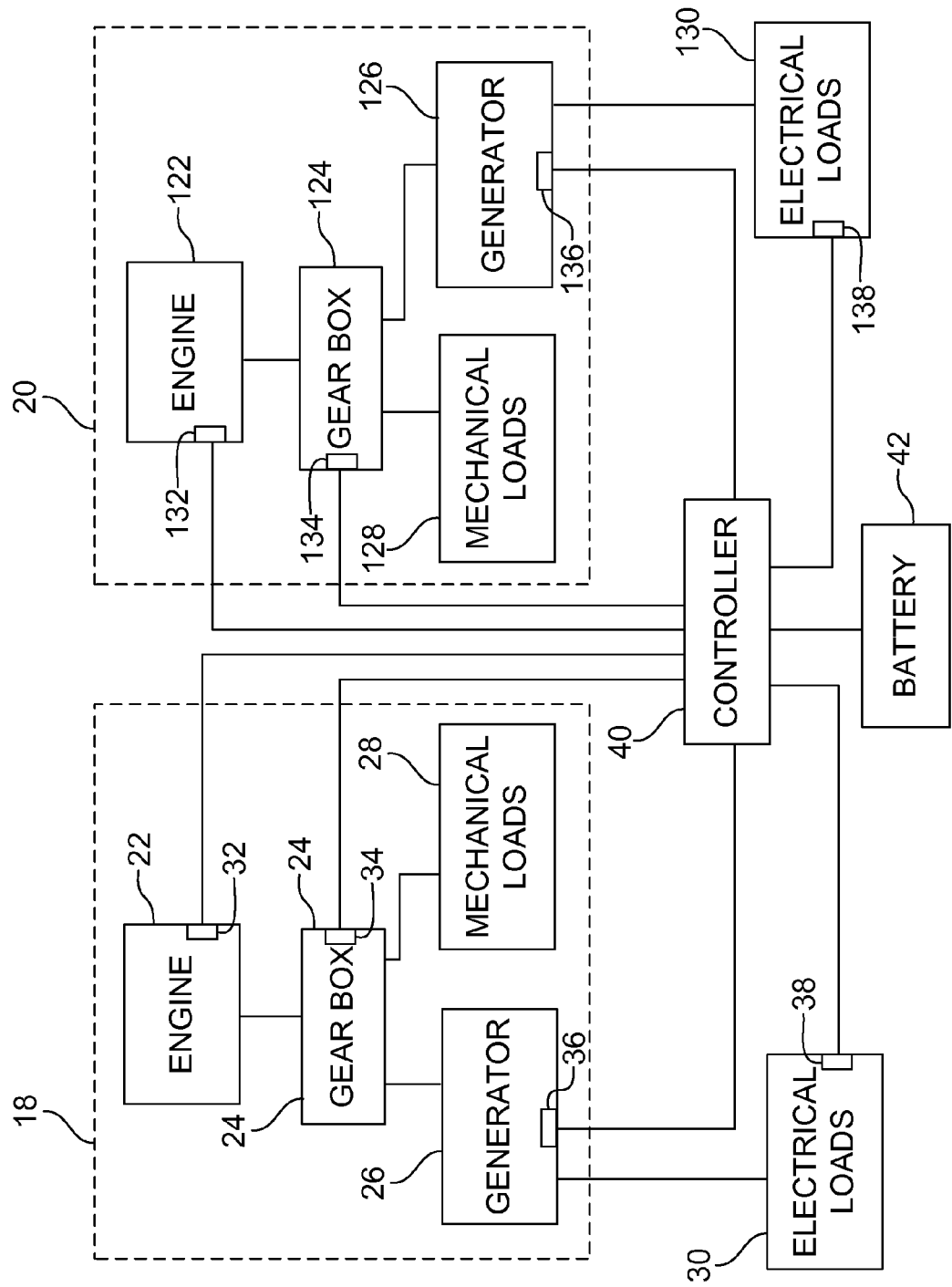
FIG. 2 is a schematical block diagram presenting the generation and starting system of FIG. 1.

Now, additionally referring to FIG. 2, there is shown schematically an illustration of an embodiment of the generation and starting system utilized by power systems 18 and 20. The elements of power system 18 include an engine 22, a gear box/transmission 24, a generator 26, mechanical loads 38, electrical loads 30, engine sensor/control 32, gear box sensor/control 34, generator sensor/control 36, and electrical load sensor/control 38. Elements of power system 20, although separate and perhaps different, are referred to with numbers that have 100 added to the similar functional elements of power system 18. A controller 40 is interconnected to many portions of power systems 18 and 20 to provide interactive control so that elements of systems 18 and 20 can be interlinked to some extent so that harvester 10 can carry out its intended mission. Controller 40 has been illustrated as a standalone controller, for the sake of clarity in the explanation of the invention. However, it is also understood that the functions of controller 40 can be undertaken by a controller utilized for other functions in harvester 10. Although the interlinking between controller 40 and other elements are shown as a single line, this line is intended to convey the understanding that information and/or power may be routed therebetween.

Engine 22 may be an internal combustion engine 22 that is interconnected to gear box 24, which may additionally be a transmission 24. Gear box 24 mechanically drives generator 26 as well as other mechanical loads 28. The distinction of mechanical loads 28 is not to infer that there is not a mechanical linkage between generator 26 and gear box 24 but rather signifies that there are additional mechanical loads that are assigned to power system 18 as well as separate mechanical loads being assigned to power system 20. For example, mechanical loads 28 may include grain separation mechanisms within harvester 10, while mechanical loads 128 may be the propulsion and hydraulic systems of harvester 10. The loads may be advantageously divided so that in the event harvester 10 is simply traveling from one field to another without the threshing system working that perhaps engine 22 may be shut off while engine 122 provides the motive power for movement of harvester 10.

Generator 26 additionally functions as an electrical motor 26 when it is driven by electrical power supplied thereto under the direction of controller 40. For example, engine 22 does not include a separate alternator that would charge the battery assigned thereto as is common place among power systems. Rather, engine 22 is started by generator/motor 26 being driven by energy supplied thereto for the mechanical movement of generator/motor 26 that drives engine 22 through gear box 24 to facilitate the movement of engine 22 so that engine 22 can then be started. During the starting process, mechanical loads 28 might be at least temporarily disengaged from gear box 24 under the direction of controller 40 sending information to sensor/controls 34. When engine 22 is started and is functioning as sensed by sensors 32 and conveyed to controller 40, controller 40 then can send controlling information to sensor/control 36 so that generator 26 then starts producing electrical power. It should be noted that although generator 26 and generator 126 are referred to as a generator, they can also be thought of as alternators or other producers of electrical power.

Controller 40 can be utilized to start power systems 18 and 20 in the following manner. Based on the need, energy from battery 42 can be first utilized and directed to either generator/motor 26 or 126 so that respectively engines 22 or 122 may be initially started. Battery 42 may be sized such that it is sufficient to provide enough energy to start either engine 22 or 122, but has insufficient energy to start both engine 22 and engine 122 without being recharged or to start engine 22 and 122 simultaneously. However, advantageously, once, for the simplicity of explanation, engine 22 has been started, then power being generated by generator 26 can then be diverted to generator/motor 126 so that engine 122 is then started without utilizing energy from battery 42. When electrical power is needed to recharge battery 42, controller 40 directs some of the electrical power to battery 42 for the necessary charging thereof. Although not illustrated, the DC/DC inverters or DC/AC converters may be utilized.

In the event that either power system 18 or 20 is experiencing a higher than normal load as sensed by controller 40, electrical loads 30 or 130 may be shifted between generator 26 and generator 126. The shifting of a load can be accomplished by either electrically connecting a load from one generator to the other generator or by feeding electrical power from one generator to the other generator. For example, if power system 18 has encountered an additional load, such as a slug going through the threshing system thereby placing a heavier mechanical load 28 on engine 22, then controller 40 will shift at least some of electrical load 30 so that it is combined with electrical loads 130 that are powered by generator 126 thereby reducing the load on power system 18. In this manner, controller 40 balances loads between power systems 18 and 20 so that engines 22 and 122 can operate closer to their most efficient performance RPM's. The shifting of electrical loads can be undertaken by electrically disconnecting a load from one generator and electrically connecting it to the other generator. The shifting of electrical loads is also meant to include the ability to supply electrical power from one generator to the other generator of the other power system to help meet the load demanded by that other power system.

The balancing of loads between power systems 18 and 20 is undertaken by controller 40, which additionally keeps track of physical attributes of power system 18 and power system 20. For example, engine 22 may be smaller than engine 122 or may have a different torque power curve so that different attributes of power systems 18 and 20 are part of the controlling algorithm of controller 40 so as to optimize the overall functioning of harvester 10. In this manner, the balancing of a load does not need to infer that the electrical loads are somehow split evenly between power system 18 and power system 20, but rather are controlled by controller 40 for optimal performance of each power system.

Controller 40 can additionally provide power to drive mechanical loads in system 18 and 20 by directing electrical power from a generator to utilize the other generator as a motor. For example, if a slug is encountered by harvester 10 and it increases mechanical load 28 significantly, controller 40 will not only shift electrical loads 30 to generator 126 but can also direct electrical power being generated by generator 126 to generator/motor 26 causing generator/motor 26 to provide mechanical power back to gear box 24 to assist in the driving of mechanical loads 28.

Harvester 10 having engines 22 and 122 each driving generators 26 and 126 respectively are coupled to drive a plurality of loads by using electricity provided by generators 26 and 126. This eliminates the need for any alternators to be separately placed on engines 22 and 122, thereby relieving them of the mechanical load placed on conventional engine systems. Generators 26 and 126 may be high voltage generators that feed a DC/DC inverter that can change the voltage and regulate the power into battery 42 and into the generator/motor system for starting the engines. Once one engine is started by utilizing electrical power from battery 42, electricity produced from the then running generator is used to start the other engine to thereby reduce the cycle load on battery 42.

Advantages of the current system include the elimination of the alternators and separate voltage control systems usually associated with each engine. The electronics of the inverter/power converters are utilized to convert electricity from high voltage power generation into the proper voltages necessary for the operation of the various electrical loads 30 and 130. This provides for higher efficiency in the electronic systems that are a part of harvester 10 since a more stable regulated power source is available. This also leads to higher reliability of the overall system. Generator/motors 26 and 126 can provide much more power for starting than a typical starter contained on an engine. This provides for much higher reliability components and allows also for the elimination of starter motor from engine 22 and 126. The higher capacity of generators/motors 26 and 126 also allows for quicker engine starting to provide for nearly instant load sharing during operation of harvester 10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle, comprising:
  a plurality of engines including a first engine and a second engine;
  a plurality of mechanical loads including a first mechanical load and a second mechanical load, said first mechanical load being coupled to said first engine, said second mechanical load being coupled to said second engine;
  a plurality of electrical generators including a first generator and a second generator, said first generator being coupled to said first engine, said second generator being coupled to said second engine;

a plurality of electrical loads separately couplable to one of said first generator and said second generator;

at least one load sensor configured to produce a signal representative of at least one of said first mechanical load on said first engine, said second mechanical load on said second engine, a sum of electrical loads on said first generator and a sum of electrical loads on said second generator; and a controller configured to shift at least one of said plurality of electrical loads between said first generator and said second generator dependent upon said signal, said at least one load sensor including a plurality of load sensors including a first load sensor and a second load sensor, said first load sensor being associated with said first engine and said second load sensor being associated with said second engine, said first load sensor producing a first signal representative of a first total load on said first engine, said second load sensor producing a second signal representative of a second total load on said second engine, said controller being configured to alter said first total load and said second total load by shifting at least one of said electrical loads from being electrically coupled to said first generator to being electrically coupled to said second generator dependent upon said first signal and said second signal, said first generator has a first performance attribute associated therewith and said second generator has a second performance attribute associated therewith, said controller being additionally configured to alter said first total load and said second total load by shifting at least one of said electrical loads from being electrically coupled to said first generator to being electrically coupled to said second generator dependent upon said first performance attribute and said second performance attribute.

2. The agricultural vehicle of claim 1, wherein said first engine has a first performance attribute associated therewith and said second engine has a second performance attribute associated therewith, said controller being additionally configured to alter said first total load and said second total load by shifting at least one of said electrical loads from being electrically coupled to said first generator to being electrically coupled to said second generator dependent upon said first performance attribute of said first engine and said second performance attribute of said second engine.

3. The agricultural vehicle of claim 1, further comprising a stored power source, said controller being further configured to direct power from said stored power source to said first generator, said first generator being configured to act as an electrical motor and to start said first engine.

4. The agricultural vehicle of claim 3, wherein said controller is further configured to direct power from said first generator to said second generator, said second generator being configured to act as an electrical motor and to start said second engine.

5. The agricultural vehicle of claim 1, wherein the agricultural vehicle is a harvester.

6. An agricultural vehicle, comprising:
a plurality of engines including a first engine and a second engine;

a plurality of mechanical loads including a first mechanical load and a second mechanical load, said first mechanical load being coupled to said first engine, said second mechanical load being coupled to said second engine;

a plurality of electrical generators including a first generator and a second generator, said first generator being coupled to said first engine, said second generator being coupled to said second engine;

a plurality of electrical loads separately couplable to one of said first generator and said second generator;

at least one load sensor configured to produce a signal representative of at least one of said first mechanical load on said first engine, said second mechanical load on said second engine, a sum of electrical loads on said first generator and a sum of electrical loads on said second generator; and a controller configured to shift at least one of said plurality of electrical loads between said first generator and said second generator dependent upon said signal, said second generator being configured to additionally function as an electrical motor, said controller being further configured to remove all of said electrical loads from said second generator and to direct electrical power from said first generator to said second generator to assist said second engine meet a demand of said second mechanical load.

7. The agricultural vehicle of claim 6, wherein said controller is further configured to connect at least some of said electrical loads removed from said second generator to said first generator.

8. The agricultural vehicle of claim 6, further comprising:
a first gear box coupled to said first engine, said first gear box serving to couple said first generator and said first mechanical load to said first engine; and a second gear box coupled to said second engine, said second gear box serving to couple said second generator and said second mechanical load to said second engine.

* * * * *